(12) United States Patent
Kasonde et al.

(10) Patent No.: US 11,794,245 B2
(45) Date of Patent: Oct. 24, 2023

(54) SUPERHARD CONSTRUCTIONS AND METHODS OF MAKING SAME

(71) Applicant: ELEMENT SIX (UK) LIMITED, Didcot (GB)

(72) Inventors: Maweja Kasonde, Didcot (GB); Teresa Rodriguez Suarez, Didcot (GB); Amanda Lynne Mckie, Didcot (GB); Edwin Stewart Eardley, Didcot (GB)

(73) Assignee: Element Six (UK) Limited, Didcot (GB)

( * ) Notice: Subject to any disclaimer, the term of this patent is extended or adjusted under 35 U.S.C. 154(b) by 0 days.

(21) Appl. No.: 17/486,756

(22) Filed: Sep. 27, 2021

(65) Prior Publication Data
US 2022/0184693 A1 Jun. 16, 2022

Related U.S. Application Data

(63) Continuation of application No. 16/474,117, filed as application No. PCT/EP2017/084368 on Dec. 22, 2017, now abandoned.

(30) Foreign Application Priority Data

Dec. 31, 2016 (GB) .................................... 1622472

(51) Int. Cl.
*E21B 10/567* (2006.01)
*B01J 3/06* (2006.01)
(Continued)

(52) U.S. Cl.
CPC .................. *B22F 3/14* (2013.01); *B22F 7/06* (2013.01); *E21B 10/567* (2013.01); *B01J 3/062* (2013.01);
(Continued)

(58) Field of Classification Search
CPC .......... E21B 10/56; E21B 10/567; B01J 3/062
See application file for complete search history.

(56) References Cited

U.S. PATENT DOCUMENTS 5,971,087 A * 10/1999 Chaves ............... E21B 10/5673
51/293
6,258,139 B1 * 7/2001 Jensen .................. B23B 27/141
51/293
(Continued)

FOREIGN PATENT DOCUMENTS

JP 2000247746 * 9/2000 .......... C04B 35/583
WO 2006032982 A1 3/2006
(Continued)

OTHER PUBLICATIONS

U.S. Appl. No. 16/474,117, Non-Final Office Action dated Mar. 26, 2021, 16 pages.
(Continued)

*Primary Examiner* — Pegah Parvini
(74) *Attorney, Agent, or Firm* — Kilpatrick Townsend & Stockton LLP (57) ABSTRACT

A super hard polycrystalline construction is disclosed as comprising a body of super hard material having a first fraction of super hard grains in a matrix of a second fraction of super hard grains. The average grain size of the first fraction is between around 1.5 to around 10 times the average grain size of the second fraction and the first fraction comprises around 5 vol % to around 30 vol % of the grains of super hard material in the body.

14 Claims, 3 Drawing Sheets

(51) Int. Cl.
 *B22F 3/14* (2006.01)
 *B22F 7/06* (2006.01)
 *B22F 3/24* (2006.01)
 *B22F 5/00* (2006.01)

(52) U.S. Cl.
 CPC ... *B01J 2203/062* (2013.01); *B22F 2003/244* (2013.01); *B22F 2005/001* (2013.01); *B22F 2207/03* (2013.01)

(56) References Cited

U.S. PATENT DOCUMENTS

2008/0230280 A1* 9/2008 Keshavan ............... C22C 1/05
 175/434
2015/0151362 A1* 6/2015 Olofsson ............ E21B 10/5671
 51/307

FOREIGN PATENT DOCUMENTS

| WO | 2014161816 | A2 | 10/2014 | | |
|---|---|---|---|---|---|
| WO | 2014161818 | A2 | 10/2014 | | |
| WO | 2015059207 | A2 | 4/2015 | | |
| WO | 2016135332 | A1 | 9/2016 | | |
| WO | WO-2016/160486 | | * | 10/2016 | ........... E21B 10/567 |

OTHER PUBLICATIONS

United Kingdom Patent Application No. GB1622472.7, Combined Search Examination Report dated May 18, 2017, 6 pages.
United Kingdom Patent Application No. GB1721707.6, Combined Search and Examination Report dated May 30, 2018, 6 pages.
International Patent Application No. PCT/EP2017/084368, International Search Report and Written Opinion dated Feb. 16, 2018, 15 pages.

* cited by examiner

SUPERHARD CONSTRUCTIONS AND METHODS OF MAKING SAME

CROSS-REFERENCE TO RELATED APPLICATIONS

This application is a continuation of U.S. patent application Ser. No. 16/474,117, filed Jun. 27, 2019, which is a U.S. National Stage of International Application No. PCT/EP2017/084368, filed Dec. 22, 2017, which claims priority of Great Britain Patent Application No. 1622472.7, filed Dec. 31, 2016, the entire disclosures of which are hereby incorporated by reference, for all purposes, as if fully set forth herein.

FIELD

This disclosure relates to super hard constructions and methods of making such constructions, particularly but not exclusively to constructions comprising polycrystalline diamond (PCD) structures attached to a substrate, and tools comprising the same, particularly but not exclusively for use in rock degradation or drilling, or for boring into the earth.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. In particular, tool inserts in the form of cutting elements comprising PCD material are widely used in drill bits for boring into the earth to extract oil or gas. The working life of super hard tool inserts may be limited by fracture of the super hard material, including by spalling and chipping, or by wear of the tool insert.

Cutting elements such as those for use in rock drill bits or other cutting tools typically have a body in the form of a substrate which has an interface end/surface and a super hard material which forms a cutting layer bonded to the interface surface of the substrate by, for example, a sintering process. The substrate is generally formed of a tungsten carbide-cobalt alloy, sometimes referred to as cemented tungsten carbide and the super hard material layer is typically polycrystalline diamond (PCD), polycrystalline cubic boron nitride (PCBN) or a thermally stable product TSP material such as thermally stable polycrystalline diamond.

Polycrystalline diamond (PCD) is an example of a super hard material (also called a superabrasive material or ultra hard material) comprising a mass of substantially intergrown diamond grains, forming a skeletal mass defining interstices between the diamond grains. PCD material typically comprises at least about 80 volume % of diamond and is conventionally made by subjecting an aggregated mass of diamond grains to an ultra-high pressure of greater than about 5 GPa, and temperature of at least about 1,200° C., for example. A material wholly or partly filling the interstices may be referred to as filler or binder material.

PCD is typically formed in the presence of a sintering aid such as cobalt, which promotes the inter-growth of diamond grains. Suitable sintering aids for PCD are also commonly referred to as a solvent-catalyst material for diamond, owing to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. Consequently the interstices within the sintered PCD product may be wholly or partially filled with residual solvent-catalyst material. Most typically, PCD is often formed on a cobalt-cemented tungsten carbide substrate, which provides a source of cobalt solvent-catalyst for the PCD.

Ever increasing drives for improved productivity in the earth boring field place ever increasing demands on the materials used for cutting rock. Specifically, PCD materials with improved abrasion and impact resistance are required to achieve faster cut rates and longer tool life.

Cutting elements for use in rock drilling and other operations require high abrasion resistance and impact resistance. One of the factors limiting the success of the polycrystalline diamond (PCD) abrasive cutters is the generation of heat due to friction between the PCD and the work material. This heat causes the thermal degradation of the diamond layer. The thermal degradation increases the wear rate of the cutter through increased cracking and spalling of the PCD layer as well as back conversion of the diamond to graphite causing increased abrasive wear.

Methods used to improve the abrasion resistance of a PCD composite often result n a decrease in impact resistance of the composite. There is therefore a need for a polycrystalline super hard composite construction that has improved impact resistance whilst also having good abrasion resistance and a method of forming such a construction.

SUMMARY

Viewed from a first aspect there is provided a super hard polycrystalline construction comprising;
  a body of super hard material having a first fraction of super hard grains in a matrix of a second fraction of super hard grains; wherein:
  the average grain size of the first fraction is between around 1.5 to around 10 times the average grain size of the second fraction; and
  the first fraction comprises around 5 vol % to around 30 vol % of the grains of super hard material in the body.

Viewed from a second aspect there is provided a method of forming a super hard polycrystalline construction comprising:
  forming a pre-sinter assembly comprising:
  a first mass of grains or particles of a super hard material;
  a second mass of grains or particles of a super hard material; the first mass of super hard grains in having an average grain size between around 1.5 to around 10 times the average grain size of the grains in the second mass; and
  a substrate; the method further comprising the steps of:
  treating the pre-sinter assembly at an ultra-high pressure of around 5 GPa or greater and a temperature to bond together the grains of super hard material to form a body of interbonded polycrystalline super hard material bonded to the substrate, the first mass forming a first fraction comprising around 5 vol % to around 30 vol % of the grains of super hard material in the body.

Viewed from a further aspect there is provided a tool comprising the superhard polycrystalline construction defined above, the tool being for cutting, milling, grinding, drilling, earth boring, rock drilling or other abrasive applications.

The tool may comprise, for example, a drill bit for earth boring or rock drilling, a rotary fixed-cutter bit for use in the oil and gas drilling industry, or a rolling cone drill bit, a hole opening tool, an expandable tool, a reamer or other earth boring tools.

Viewed from another aspect there is provided a drill bit or a cutter or a component therefor comprising the superhard polycrystalline construction defined above.

BRIEF DESCRIPTION OF THE DRAWINGS

Various versions will now be described by way of example and with reference to the accompanying drawings in which.

The same references refer to the same general features in all the drawings.

DESCRIPTION

As used herein, a "super hard material" is a material having a Vickers hardness of at least about 28 GPa. Diamond and cubic boron nitride (cBN) material are examples of super hard materials.

As used herein, a "super hard construction" means a construction comprising a body of polycrystalline super hard material. In such a construction, a substrate may be attached thereto.

As used herein, polycrystalline diamond (PCD) is a type of polycrystalline super hard (PCS) material comprising a mass of diamond grains, a substantial portion of which are directly inter-bonded (intergrown) with each other and in which the content of diamond is at least about 80 volume percent of the material. In one example of PCD material, directly after sintering, interstices between the diamond grains may be at least partly filled with a binder material comprising a catalyst for diamond. As used herein, "interstices" or "interstitial regions" are regions between the diamond grains of PCD material.

A "catalyst material" for a super hard material is capable of promoting the growth or sintering of the super hard material.

The term "substrate" as used herein means any substrate over which the super hard material layer is formed. For example, a "substrate" as used herein may be a transition layer formed over another substrate.

As used herein, the term "integrally formed" means regions or parts are produced contiguous with each other and are not separated by a different kind of material.

Figure 1:
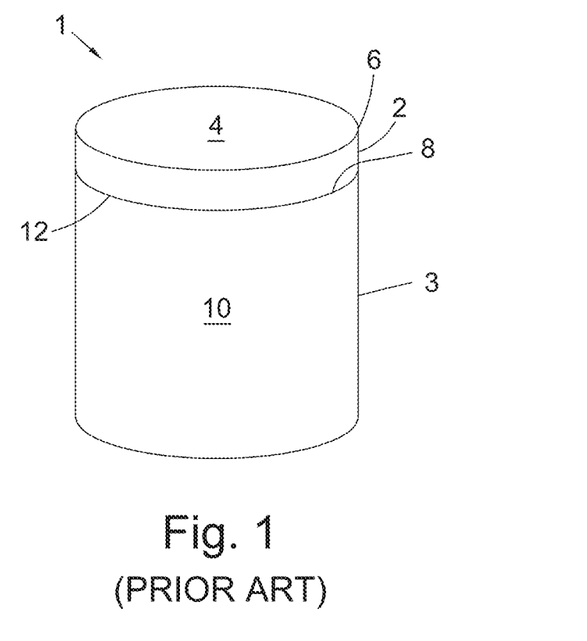
FIG. 1 is a perspective view of an example of a PCD cutter element or construction for a drill bit for boring into the earth.

FIG. 1 is a schematic view of an example of a conventional PCD super hard construction such as a cutting element 1 which includes a substrate 3 with a layer of super hard material 2 formed on the substrate 3. The substrate 3 may be formed of a hard material such as cemented tungsten carbide. The super hard material 2 may be, for example, high density polycrystalline diamond (PCD) comprising at least 80 vol % of interbonded (intergrown) diamond grains. The cutting element 1 may be mounted into a bit body such as a drag bit body (not shown) and may be suitable, for example, for use as a cutter insert for a drill bit for boring into the earth.

The exposed top surface of the super hard material opposite the substrate forms the cutting face 4, also known as the working surface, which is the surface which, along with its edge 6, performs the cutting in use.

At one end of the substrate 3 is an interface surface 8. As shown in FIG. 1, the substrate 3 is generally cylindrical and has a peripheral surface 10 and a peripheral top edge 12.

The working surface or "rake face" 4 of the polycrystalline composite construction 1 is the surface or surfaces over which the chips of material being cut flow when the cutter is used to cut material from a body, the rake face 4 directing the flow of newly formed chips. This face 4 is commonly also referred to as the top face or working surface of the cutting element as the working surface 4 is the surface which, along with its edge 6, is intended to perform the cutting of a body in use. It is understood that the term "cutting edge", as used herein, refers to the actual cutting edge, defined functionally as above, at any particular stage or at more than one stage of the cutter wear progression up to failure of the cutter, including but not limited to the cutter in a substantially unworn or unused state.

As used herein, "chips" are the pieces of a body removed from the work surface of the body being cut by the polycrystalline composite construction 1 in use.

As used herein, a "wear scar" is a surface of a cutter formed in use by the removal of a volume of cutter material due to wear of the cutter. A flank face may comprise a wear scar. As a cutter wears in use, material may progressively be removed from proximate the cutting edge, thereby continually redefining the position and shape of the cutting edge, rake face and flank as the wear scar forms.

The substrate 3 is typically formed of a hard material such as a cemented carbide material, for example, cemented tungsten carbide.

Figure 2A:
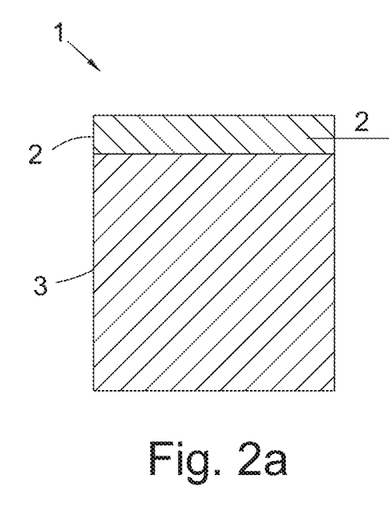
FIG. 2a is a schematic cross-section of the cutting element of FIG. 1.
Figure 2B:
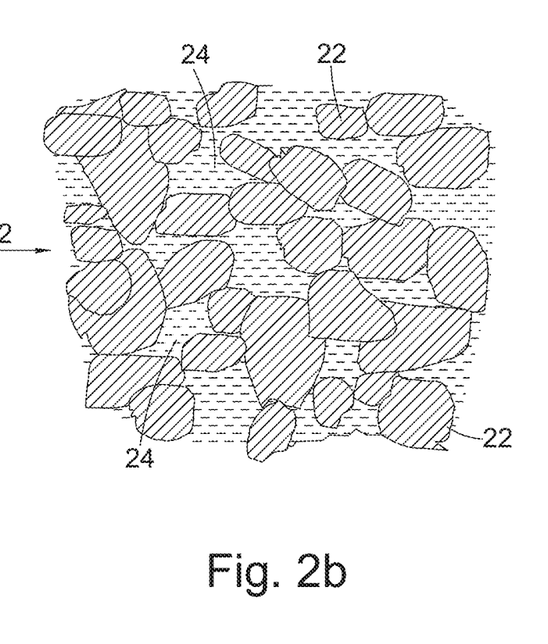
FIG. 2b is a schematic cross-section of the cutting element of FIG. 2a showing the interstices between the inter-bonded diamond grains filled with a non-diamond phase material.

As shown in FIG. 2, during formation of a conventional polycrystalline composite construction 1, the interstices 24 between the inter-bonded grains 22 of super hard material such as diamond grains in the case of PCD, may be at least partly filled with a non-super hard phase material. This non-super hard phase material, also known as a filler material may comprise residual catalyst/binder material, for example cobalt.

Figure 3:
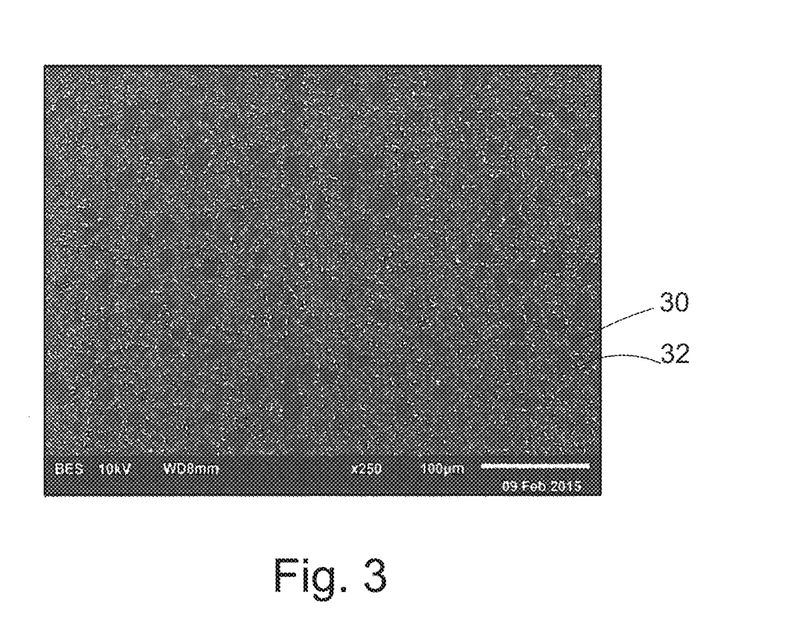
FIG. 3 is a cross-section through a first example of a super hard construction showing the microstructure of the construction.

In a first example, as shown by the microstructure of the super hard material of FIG. 3, the polycrystalline super hard material of examples comprises a matrix of fine grains (for example having a mean grain size of about 10 micrometres) with additional large grains embedded therein (for example having a mean particle size of about 30 micrometres) sintered using cobalt metal catalyst in an HPHT vehicle.

The super hard material of the various examples used to form the layer or region of super hard material, may be, for example, polycrystalline diamond (PCD) and/or polycrystalline cubic boron nitride (PCBN) and/or lonsdalite and the super hard particles or grains may be of natural and/or synthetic origin.

The substrate of the examples, may be formed of a hard material such as a cemented carbide material and may include, for example, cemented tungsten carbide, cemented tantalum carbide, cemented titanium carbide, cemented molybdenum carbide or mixtures thereof. The binder metal for such carbides suitable for forming the substrate may be, for example, nickel, cobalt, iron or an alloy containing one or more of these metals and may include additional elements or compounds of other materials such as chromium, or vanadium. This binder may, for example, be present in an amount of 10 to 20 mass %, but this may be as low as 6 mass % or less.

In some examples, the layer or region of super hard material may comprise PCBN. Components comprising PCBN are used principally for machining metals. PCBN material comprises a sintered mass of cubic boron nitride (cBN) grains. The cBN content of PCBN materials may be at least about 40 volume %. When the cBN content in the PCBN is at least about 70 volume % there may be substantial direct contact among the cBN grains. When the cBN content is in the range from about 40 volume % to about 60 volume % of the compact, then the extent of direct contact among the cBN grains is limited. PCBN may be made by subjecting a mass of cBN particles together with a powdered matrix phase, to a temperature and pressure at which the cBN is thermodynamically more stable than the hexagonal form of boron nitride, hBN. PCBN is less wear resistant than PCD which may make it suitable for different applications to that of PCD.

As used herein, a PCD or PCBN grade is a PCD or PCBN material characterised in terms of the volume content and size of diamond grains in the case of PCD or cBN grains in the case of PCBN, the volume content of interstitial regions between the grains, and composition of material that may be present within the interstitial regions. A grade of super hard material may be made by a process including providing an aggregate mass of super hard grains having a size distribution suitable for the grade, optionally introducing catalyst material or additive material into the aggregate mass, and subjecting the aggregated mass in the presence of a source of catalyst material for the super hard material to a pressure and temperature at which the super hard grains are more thermodynamically stable than graphite (in the case of diamond) or hBN (in the case of CBN), and at which the catalyst material is molten. Under these conditions, molten catalyst material may infiltrate from the source into the aggregated mass and is likely to promote direct intergrowth between the diamond grains in a process of sintering, to form a polycrystalline super hard structure. The aggregate mass may comprise loose super hard grains or super hard grains held together by a binder material. In the context of diamond, the diamond grains may be natural or synthesised diamond grains.

In particular, the grains of super hard material may be, for example, diamond grains or particles. In the starting mixture prior to sintering they may be, for example, bimodal, that is, the feed comprises a mixture of a coarse fraction of diamond grains and a fine fraction of diamond grains. In some examples, the coarse fraction may have, for example, an average particle/grain size ranging from about 10 to 60 microns. By "average particle or grain size" it is meant that the individual particles/grains have a range of sizes with the mean particle/grain size representing the "average". The average particle/grain size of the fine fraction is less than the size of the coarse fraction. For example, the coarse fraction may have an average grain size of at least 1.5 the size of the fine fraction, and may, in some examples, be at least 2 times the size of the fine fraction or up to around 10 times the size of the fine fraction, for example around 7 times the size.

In some examples, the volume ratio of the coarse diamond fraction to the fine diamond fraction may range from about 5% to about 30% coarse diamond and the volume ratio of the fine diamond fraction may be from about 70% to about 95%.

Some examples consist of a wide bi-modal size distribution between the coarse and fine fractions of super hard material, but some examples may include three or even four or more size modes.

Sizing of diamond particles/grains into fine fraction, coarse fraction, or other sizes in between, may be through known processes such as jet-milling of larger diamond grains and the like.

In some examples, the cemented metal carbide substrate may, for example, be conventional in composition and, thus, may include any of the Group IVB, VB, or VIB metals, which are pressed and sintered in the presence of a binder of cobalt, nickel or iron, or alloys thereof. In some examples, the metal carbide is tungsten carbide.

In some examples, the substrate may be pre-formed for example by pressing the green body of grains of hard material such as tungsten carbide into the desired shape, including the interface features at one free end thereof, and sintering the green body to form the substrate element. In an alternative example, the substrate interface features may be machined from a sintered cylindrical body of hard material, to form the desired geometry for the interface features. The substrate may, for example, comprise WC particles bonded with a catalyst material such as cobalt, nickel, or iron, or mixtures thereof. A green body for the superhard construction, which comprises the pre-formed substrate, and the particles of superhard material such as diamond particles or cubic boron nitride particles, may be placed onto the substrate, to form a pre-sinter assembly which may be encapsulated in a capsule for an ultra-high pressure furnace, as is known in the art. In particular, the superabrasive particles, for example in powder form, are placed inside a metal cup formed, for example, of niobium, tantalum, or titanium. The pre-formed substrate are placed inside the cup and hydrostatically pressed into the superhard powder such that the requisite powder mass is pressed around the interface features of the preformed carbide substrate to form the pre-composite. The pre-composite is then outgassed at about 1050 degrees C. The pre-composite is closed by placing a second cup at the other end and the pre-composite is sealed by cold isostatic pressing or EB welding. The pre-composite is then sintered to form the sintered body.

In some examples, the superhard grains may be diamond grains and the substrate may be cobalt-cemented tungsten carbide. The pre-sinter assembly may comprise an additional source of catalyst material such as a disc or surrounding cup containing catalyst material such as cobalt which may be placed adjacent to and/or around the diamond grains in the pre-composite assembly.

In one example, the method may include loading the capsule comprising a pre-sinter assembly into a press and subjecting the green body to an ultra-high pressure and a temperature at which the superhard material is thermodynamically stable to sinter the superhard grains. In some examples, the green body may comprise diamond grains and the pressure to which the assembly is subjected is at least about 5 GPa and the temperature is at least about 1,300 degrees centigrade. In some examples, the pressure to which the assembly may be subjected is around 5.5-6 GPa, but in some examples it may be around 7.7 GPa or greater. Also, in some examples, the temperature used in the sintering process may be in the range of around 1400 to around 1500 degrees C.

After sintering, the polycrystalline super hard constructions may be ground to size and may include, if desired, a 45° chamfer of approximately 0.4 mm height on the body of polycrystalline super hard material so produced.

Solvent/catalyst for diamond may be introduced into the aggregated mass of diamond grains by various methods, including blending solvent/catalyst material in powder form with the diamond grains, depositing solvent/catalyst material onto surfaces of the diamond grains, or infiltrating solvent/catalyst material into the aggregated mass from a source of the material other than the substrate, either prior to the sintering step or as part of the sintering step. Methods of depositing solvent/catalyst for diamond, such as cobalt, onto surfaces of diamond grains are well known in the art, and include chemical vapour deposition (CVD), physical vapour deposition (PVD), sputter coating, electrochemical methods, electroless coating methods and atomic layer deposition (ALD). It will be appreciated that the advantages and disadvantages of each depend on the nature of the sintering aid material and coating structure to be deposited, and on characteristics of the grain.

In one example, the binder/catalyst such as cobalt may be deposited onto surfaces of the diamond grains by first depositing a pre-cursor material and then converting the precursor material to a material that comprises elemental metallic cobalt. For example, in the first step cobalt carbonate may be deposited on the diamond grain surfaces using the following reaction:

$Co(NO_3)_2 + Na_2CO_3 \rightarrow CoCO_3 + 2NaNO_3$

The deposition of the carbonate or other precursor for cobalt or other solvent/catalyst for diamond may be achieved by means of a method described in PCT patent publication number WO2006/032982. The cobalt carbonate may then be converted into cobalt and water, for example, by means of pyrolysis reactions such as the following:

$CoCO_3 \rightarrow CoO + CO_2$ $CoO + H_2 \rightarrow Co + H_2O$

In another example, cobalt powder or precursor to cobalt, such as cobalt carbonate, may be blended with the diamond grains. Where a precursor to a solvent/catalyst such as cobalt is used, it may be necessary to heat treat the material in order to effect a reaction to produce the solvent/catalyst material in elemental form before sintering the aggregated mass.

In some examples, the cemented carbide substrate may be formed of tungsten carbide particles bonded together by the binder material, the binder material comprising an alloy of Co, Ni and Cr. The tungsten carbide particles may form at least 70 weight percent and at most 95 weight percent of the substrate. The binder material may comprise between about 10 to 50 wt. % Ni, between about 0.1 to 10 wt. % Cr, and the remainder weight percent comprises Co.

To render the layer or region of polycrystalline super hard material more thermally stable, the sintered cutter construction may be subjected to a leaching treatment process to remove accessible residual catalyst binder material from that layer or region, for example a boiling HCl acid leaching treatment.

Examples are described in more detail below which are provided herein by way of illustration only and are not intended to be limiting.

EXAMPLES

The starting powders are prepared by milling 1 gram of spherical particle cobalt powder of particle size of about 2 micrometres in a Retsch planetary ball mill in 10 grams of liquid methanol with 125 grams of WC balls at 90 rpm for 10 minutes. Then 84 grams of the fine grain diamond material, in this case having an average particle size of 10 micrometres is added to the milled mixture together with 20 grams of methanol and 125 grams of WC balls. The mixture is milled for a further 20 minutes at 120 rpm. In a further stage, 14 grams of the coarse diamond feed material, in this case diamond particles having an average particle size of 30 micrometres is added to the milled mixture along with 10 grams of methanol and the combination is milled for a further 20 minutes at 90 rpm to form a slurry.

The slurry is then dried in a rotovapor at 70 C to remove the solvent (methanol) and form a dry powder which is then sieved under 106 micrometres.

To prepare the precomposite, about two grams of the dry powder is placed in a niobium cup. A WC substrate is introduced in the cup and pressed on the powder. The precomposite can be compacted by a manual or hydraulic press or by vibration compaction.

The precomposite is then outgassed under vacuum at about 1100 C for 5 hours.

The outgassed precomposite is then sealed by electron beam welding to form a precomposite assembly. The assembly is then subjected to an HPHT (high pressure and high temperature) sintering process at a temperature above 1450 C and a pressure above around 6 GPa to sinter the composite.

Further examples 2 to 4, 6 and 7 were prepared with the percentages of fine and coarse grained particles as set out in Table 1, according to the above method.

TABLE 1

| | Mean particle size of fine diamond | | Mean particle size of course diamond | |
|---|---|---|---|---|
| | 4 μm diamond (vol. %) | 10 μm diamond (vol. %) | 15 μm diamond (vol. %) | 30 μm diamond (vol. %) |
| Example 1 | | 85 | | 15 |
| Example 2 | | 90 | | 10 |
| Example 3 | 85 | | 15 | |
| Example 4 | 85 | | | 15 |
| Example 5 | 70 | | 15 | 15 |
| Example 6 | | 80 | | 20 |
| Example 7 | | 70 | | 30 |

To prepare a sample according to example 5 in the table above, 1 gram of spherical particle cobalt powder of particle size of about 2 micrometres was milled together with 69.3 grams of the fine diamond particles having a mean particle size of 4 micrometres in a Retsch planetary ball mill in 30 grams of liquid methanol with 125 grams of WC balls at 90 rpm for 10 minutes. Then 14 grams of diamond powder having a mean particle size of 15 micrometres was added to the milled mixture together with 10 grams of methanol and 125 grams of WC balls. The mixture was then milled for a further 20 minutes at 90 rpm. Then 14 grams of the coarse diamond feed material, in this case particles having a mean particle size of 30 micrometres was added along with 10 grams of methanol and milled for a further 20 minutes at 90 rpm to form a slurry.

The slurry was dried in a rotovapor at 70 C to remove the solvent (methanol) and the dry powder was sieved under 106 micrometres. To prepare the precomposite, about two grams of the dry powder was placed in a niobium cup. A WC substrate was introduced into the cup and pressed on the powder. The precomposite may be compacted by a manual or hydraulic press or by vibration compaction. The precomposite was then outgassed under vacuum at about 1100 C for 5 hours. The outgassed precomposite was then sealed by electron beam welding to form a precomposite assembly which was then subjected to an HPHT treatment in an HPHT vehicle at a temperature above 1450 C and pressure above 6 GPa.

The cutter constructions prepared according to the above examples were recovered after sintering and fully processed. The samples were also analysed using SEM imaging techniques which showed that the size ratios and sizes of the sintered grains were retained in the sintering process so corresponded to original sizes in the starting materials. In some examples, the constructions were treated to remove some or all accessible residual catalyst binder material in the interstitial spaces between the interbonded diamond grains of the sintered construction. This may be achieved by, for example, subjecting the cutter construction to a boiling HCl acid leaching treatment to remove all accessible catalysing material from the PCD structure, but other conventional techniques for leaching may be used.

Figure 4:
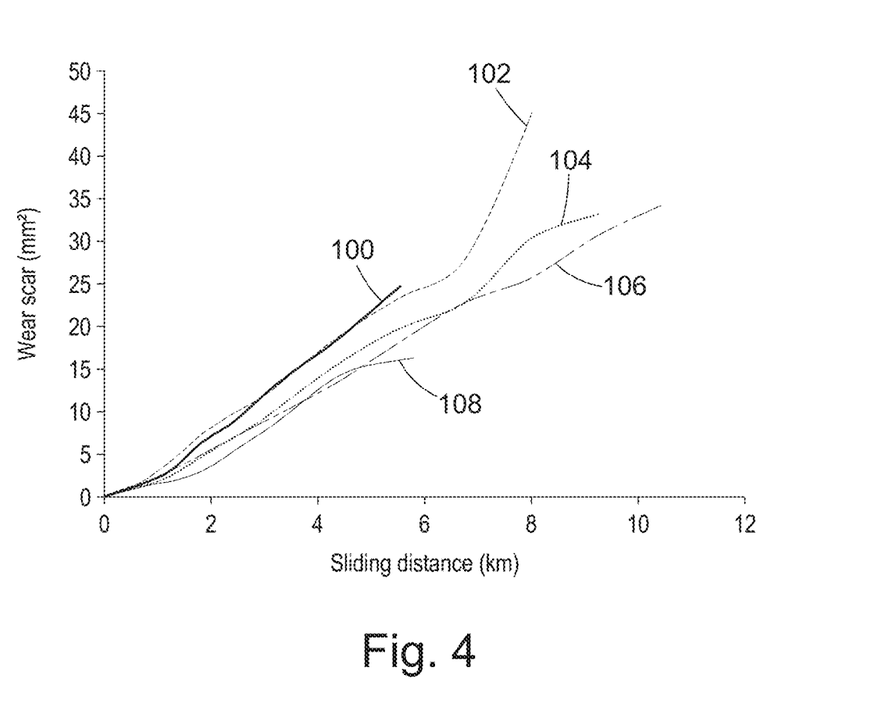
FIG. 4 is a plot showing the results of a vertical borer test comparing three example cutters with two conventional PCD cutter elements.

The cutter constructions of the examples were then subjected to a vertical turret lathe test as were a number of reference cutters formed of conventional PCD material. The results are shown in FIGS. 4 to 6.

In this test, the wear flat area was measured as a function of the number of passes of the cutter element boring into the workpiece. The results provide an indication of the total wear scar area plotted against cutting length. As shown in FIG. 4, the example cutters denoted by reference numerals 102, 104 and 106, were able to achieve a longer resistance to spalling indicated by the longer working life than the conventional cutters denoted by reference numerals 100 and 108.

Figure 5:
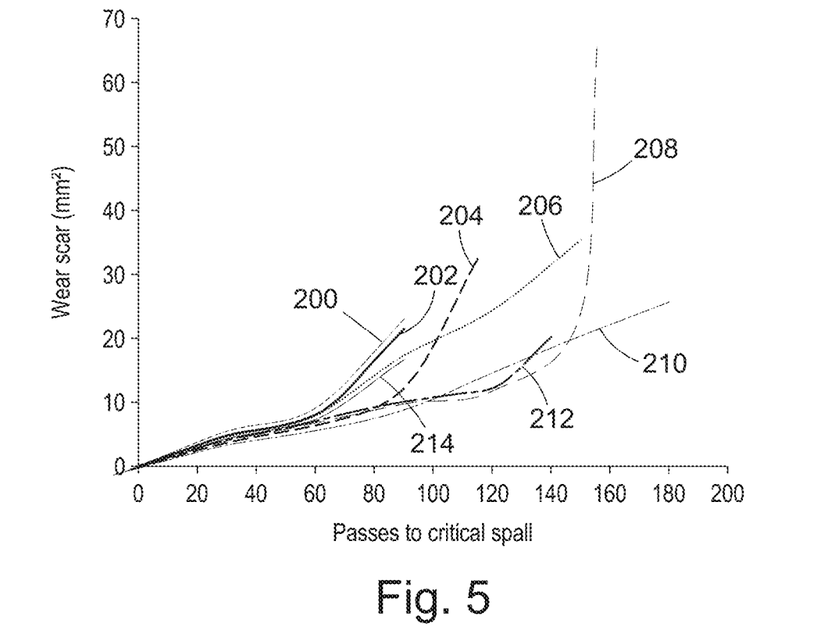
FIG. 5 is a plot showing the results of a vertical borer test for two example cutters with four conventional PCD elements.
Figure 6:
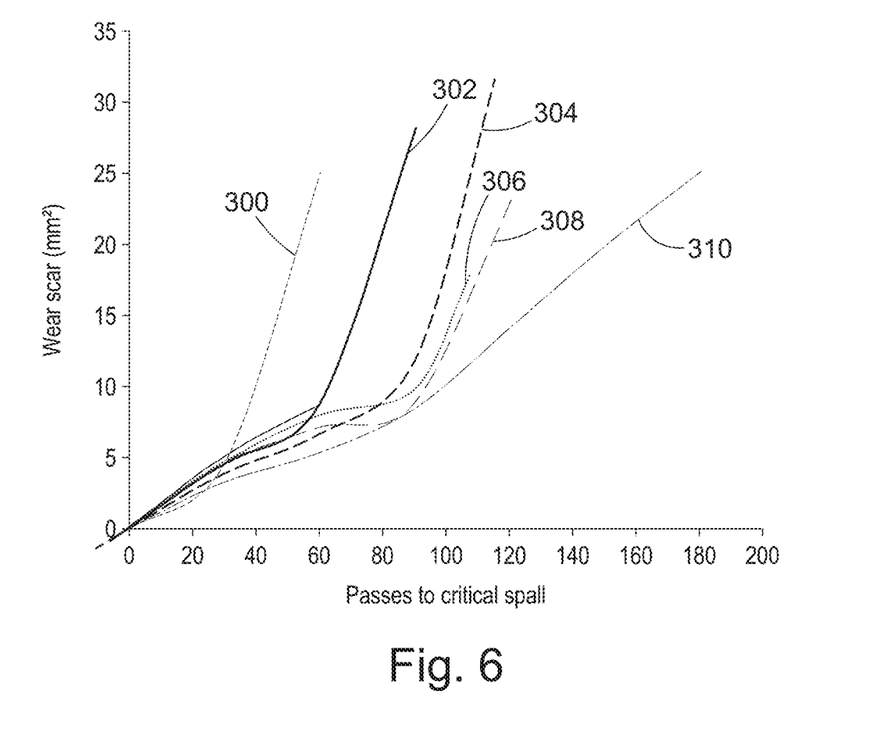
FIG. 6 is a plot showing the results of a vertical borer test for an example cutter with five conventional PCD elements.

Similarly, as shown by the results in FIG. 5, which shows the results of a vertical borer test for two example cutters (denoted by reference numerals 208 and 210) compared to four conventional PCD cutters (reference numerals 200, 202, 204, 206, 212 and 214) the example cutters were able to achieve a longer resistance to spalling indicated by the longer working life than the conventional cutters. FIG. 6 shows the results of a vertical borer test for an example cutter (reference numeral 310) with five conventional PCD cutters (300, 302, 304, 306, 308) which further confirms the example cutters were able to achieve a longer resistance to spalling indicated by the longer working life than the conventional cutters.

Thus it will be seen that the super hard constructions formed according to examples were able to achieve a significant cutting length and small wear scar area showing that the constructions had a long working life.

The super hard constructions of the examples may be finished by, for example, grinding, to provide a super hard element which is substantially cylindrical and having a substantially planar working surface, or a generally domed, pointed, rounded conical or frusto-conical working surface. The super hard element may be suitable for use in, for example, a rotary shear (or drag) bit for boring into the earth, for a percussion drill bit or for a pick for mining or asphalt degradation.

While various versions have been described with reference to a number of examples, those skilled in the art will understand that various changes may be made and equivalents may be substituted for elements thereof and that these examples are not intended to limit the particular versions disclosed. For example, whilst the examples described have a single layer of super hard material, in other examples, only a portion of the cutting volume may be composed of the super hard material of the examples and the remainder of the cutting volume may be composed of a different material such as conventional PCD or a composition having a different diamond grade or grades or a ceramic material. Furthermore, in some examples, the coarse fraction particles may be, for example, single crystal particles or polycrystalline agglomerates of diamond grit, CVD crushed particles, diamond obtained by PVD methods, and/or natural or synthesised diamond. In addition, whilst the ratio of particle sizes may be with reference to the equivalent diameter of coarse particles to the equivalent diameter of the fine particles in the matrix, it will be understood that the ratio of particle size may also be the ratio of volume fraction of the large particles divided by the volume fraction of the fine particles comprising the main matrix in the super hard region of the construction.

The invention claimed is:

1. A super hard polycrystalline diamond construction comprising:
    a body of super hard material having a first fraction of super hard diamond grains in a matrix of a second fraction of super hard diamond grains; wherein the body has at least one region forming a thermally stable region having at most 3 weight percent of catalyst material for diamond; wherein:
    an average grain size of the first fraction is between around 1.5 to around 10 times an average grain size of the second fraction;
    the first fraction comprises around 5 vol % to around 30 vol % of the diamond grains of super hard material in the body; and
    the second fraction comprises from about 70 vol % to about 95 vol % of the diamond grains of super hard material in the body.

2. The construction of claim 1, wherein the average grain size of the first fraction is between around 2 to around 7 times the average grain size of the second fraction.

3. The construction of claim 1, wherein the first fraction of super hard grains comprises any one or more of single crystal particles or polycrystalline agglomerates of diamond grit, CVD crushed particles, diamond obtained by PVD methods, natural diamond, or diamond of synthetic origin.

4. The construction of claim 1, wherein the second fraction of super hard diamond grains comprises a plurality of intergrown diamond grains.

5. The construction of claim 1, further comprising a substrate bonded to the body of super hard material along an interface.

6. The construction of claim 5, wherein the substrate comprises a cemented carbide material.

7. The construction of claim 1, wherein the body further comprises a region having a different composition to the first and second fractions.

8. The construction of claim 7, wherein the region comprises interbonded diamond grains having a different average super hard grain size to the first fraction and/or the second fraction.

9. A super hard polycrystalline diamond construction for a rotary shear bit for boring into the earth, or for a percussion drill bit, comprising the super hard polycrystalline construction as claimed in claim 1.

10. A tool comprising a super hard polycrystalline diamond construction according to claim 1, the tool being for cutting, milling, grinding, drilling, earth boring, rock drilling or another abrasive application.

11. A tool according to claim 10, wherein the tool comprises a drill bit for earth boring or rock drilling.

12. A drill bit or a cutter or a component therefor comprising the super hard polycrystalline diamond construction according to claim 1.

13. A method of forming a super hard polycrystalline diamond construction comprising:
   forming a pre-sinter assembly comprising:
   a first mass of diamond grains or particles;
   a second mass of diamond grains or particles; the first mass of diamond grains in having an average grain size between around 1.5 to around 10 times an average grain size of the diamond grains in the second mass; and
   a substrate; the method further comprising the steps of:
   treating the pre-sinter assembly at an ultra-high pressure of around 5 GPa or greater and a temperature to bond together the diamond grains to form a body of interbonded polycrystalline diamond grains bonded to the substrate, the first mass forming a first fraction comprising around 5 vol % to around 30 vol % of the diamond grains in the body; and
   the second mass forms a second fraction comprising from about 70 vol % to about 95 vol % of the diamond grains in the body; the method further comprising treating the polycrystalline diamond construction to remove accessible residual catalyst/binder material from at least some interstitial spaces between the interbonded polycrystalline diamond grains wherein the body has at least one region forming a thermally stable region having at most 3 weight percent of catalyst material for diamond.

14. The method of claim 13, wherein the step of forming the pre-sinter assembly comprises:
   providing a source of cobalt as the catalysing material for the diamond grains.

* * * * *